United States Patent [19]

Pagano et al.

[11] 4,188,503
[45] Feb. 12, 1980

[54] DIGITAL DATA COMMUNICATIONS SYSTEM

[75] Inventors: Carmine N. Pagano, Newark; Anthony D. Di'Giorgio, East Brunswick, both of N.J.

[73] Assignee: The United States of America as represented by the Secretary of the Army, Washington, D.C.

[21] Appl. No.: 922,150

[22] Filed: Jul. 5, 1978

[51] Int. Cl.² ........................ H04L 27/14; H03D 3/00
[52] U.S. Cl. ...................................... 178/88; 329/105
[58] Field of Search ............... 325/30, 38 A, 320; 329/105; 364/484, 514, 574, 701; 340/146.1 AB

[56] References Cited

U.S. PATENT DOCUMENTS

| | | | |
|---|---|---|---|
| 3,292,147 | 12/1966 | Dascotte | 340/146.1 AB |
| 3,860,874 | 1/1975 | Malone et al. | 325/320 |
| 3,885,140 | 5/1975 | Schlatter | 364/701 |
| 3,992,636 | 11/1976 | Kiffmeyer | 340/146.1 AB |
| 4,061,979 | 12/1977 | Walker et al. | 325/419 |

Primary Examiner—Benedict V. Safourek
Attorney, Agent, or Firm—Nathan Edelberg; Sheldon Kanars; Daniel D. Sharp

[57] ABSTRACT

A digital data communications system including control techniques and circuitry for providing ternary detection; that is, mark, space, mark or space indeterminate states. The indeterminate state is useful in preventing synchronism loss during momentary propagation disturbances and to provide tighter system control.

6 Claims, 7 Drawing Figures

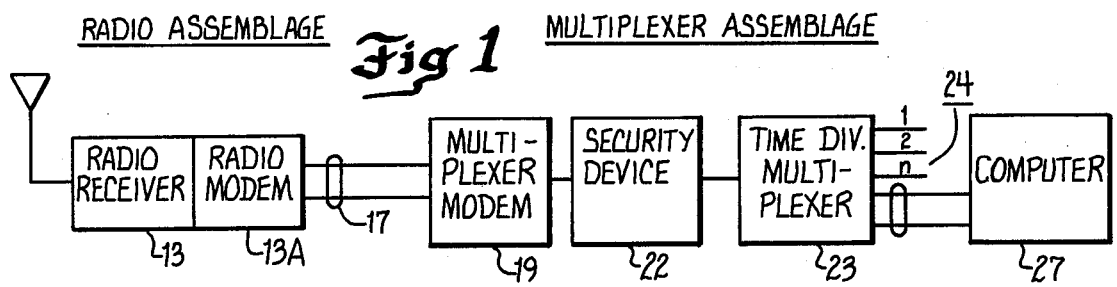
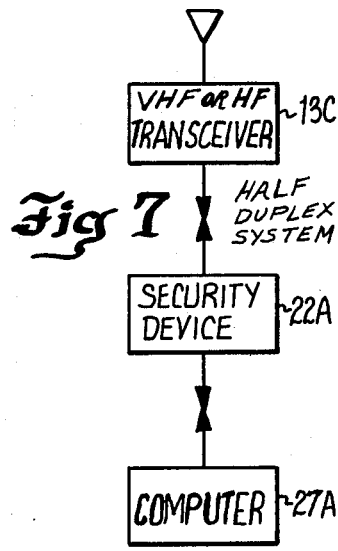
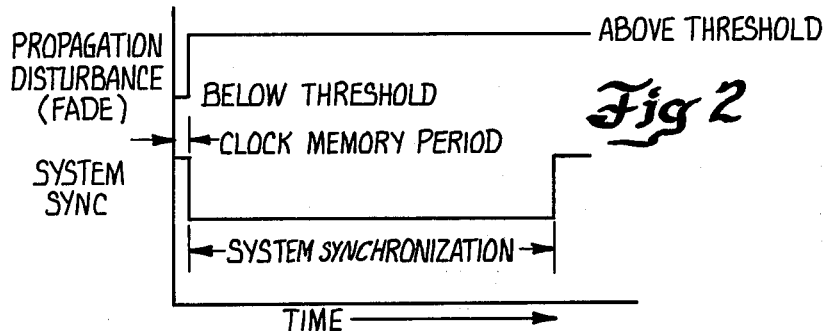
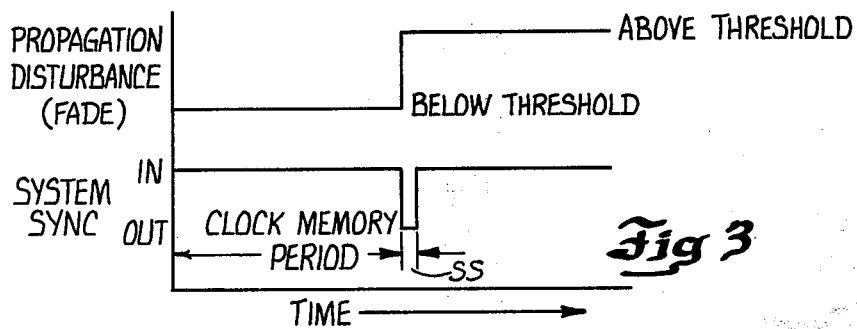
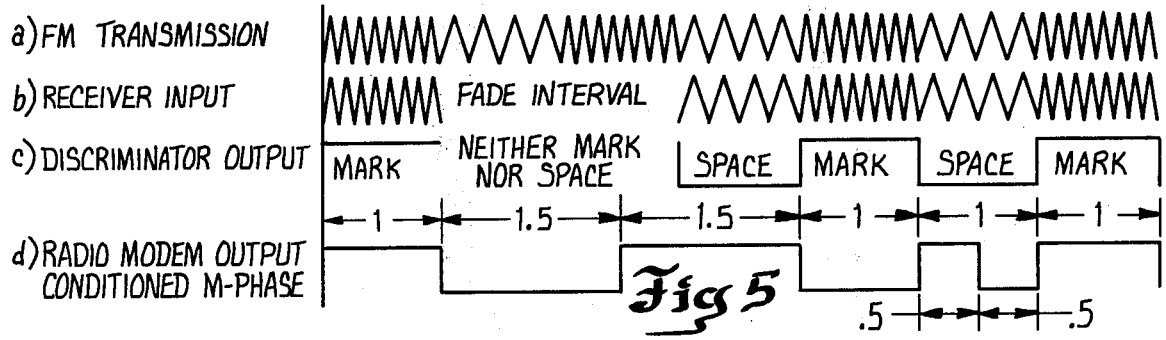
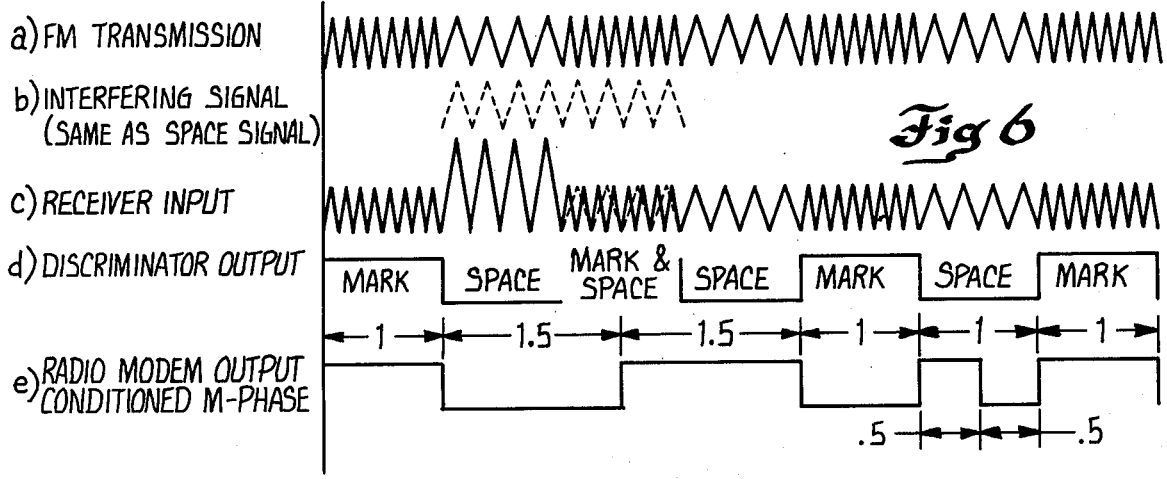

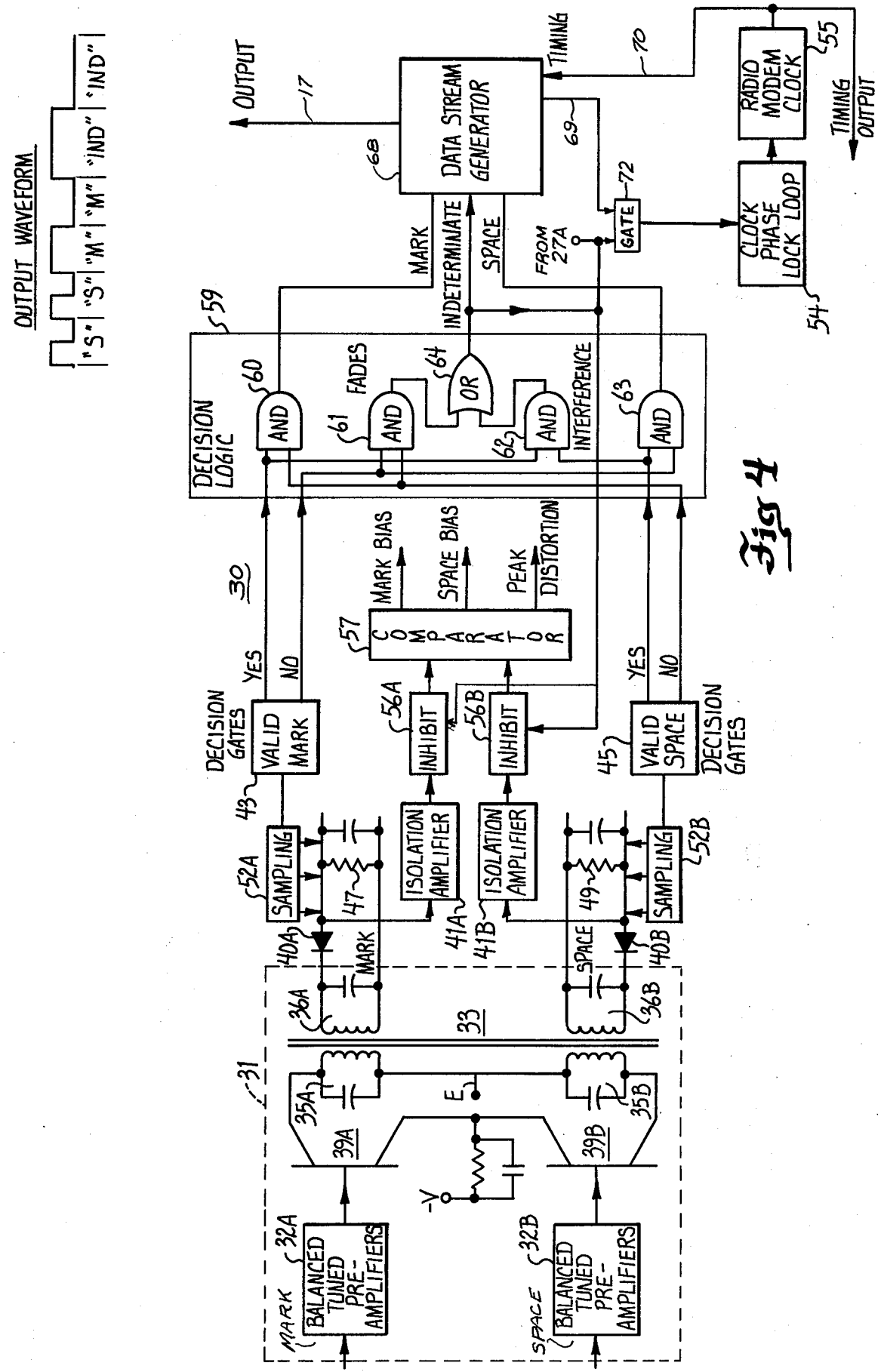

DIGITAL DATA COMMUNICATIONS SYSTEM

The invention described herein may be manufactured and used by or for the United States Government for governmental purposes without the payment of any royalties therefor or thereon.

FIELD OF THE INVENTION

The invention relates to digital data communications systems and more particularly to such a system having control techniques and circuitry for preventing loss of synchronism between the various units of the system and minimizing information loss during momentary propagation disturbances.

PRIOR ART STATEMENT AND BACKGROUND OF THE INVENTION

Noise, loss of synchronization of the various components in the system, and signal fade are universal problems in the transmission of digital data. Various techniques have been devised to meet these problems. The present invention discloses a system wherein first and second detection means provide a mark and space signal indication, and a ternary detection means provides an indication of a mark or space signal indeterminate condition. A technique which appears to be pertinent to the present invention is the duobinary modulation technique which provides a three level output modulation signal for purposes of increasing transmission speed.

As mentioned, digital data communication systems are quite susceptible to noise disturbances. As is known, in voice communication systems a word may still be intelligible despite some information loss; however, in data communication systems, a single bit loss may cause a loss of an entire portion of the message.

In prior art digital data communication systems, once the receiving radio modem loses synchronization, all equipments in the receiving chain lose synchronization since they are serially connected. This extends the interval of the instability (error extension) and it results in rapid system performance degradation. Obviously, this problem becomes more serious as the noise conditions become worse.

Accordingly, tactical applications for digital data communication systems, and actually digital data communication systems in general, require the maintenance of good communications despite poor propagation conditions and despite noise interference; therefore, there is need to improve the noise margins and reliability of digital data communication systems.

SUMMARY OF THE INVENTION

Prior art digital data communications systems provide binary detection of the data being transmitted. As will become clear hereinbelow, the present invention provides a control technique and circuitry for providing detection of an additional signal status; that is, three level or ternary detection of the digital data being transmitted. More specifically, the present invention provides synchronizing techniques and circuitry wherein a signal discriminator detects the normal mark signals and space signals, and in addition, detects and provides a third level output signal indicating an indeterminate condition; that is when neither mark nor space signals exist (fading), or when mark and space signals exist simultaneously (interference). The ternary output provided by the invention results in precise three level coding of the output data stream from the radio modem. Accordingly, timing corrections can be inhibited in that equipment which serially connects after the receiver, during indeterminate intervals, for a period of time dependent upon the stability of the clock. This is possible because the indeterminate state coded on the data stream is detected by equipments in the receiving chain and energy flow into their clock phase lock loops, clock corrections, and frame error counting can be inhibited during indeterminate intervals. Clock correction and frame error counting circuits become active only during valid mark and space intervals.

The inventive system thus provides a unique improvement over the existing equipments which detect mark or space information only, and wherein unnecessary bit and frame synchronization may result in extended information loss and wherein periods of propagation loss or interference are misinterpreted as a need to resynchronize the system.

DESCRIPTION OF THE DRAWINGS

FIG. 1 is a block diagram of a typical multichannel data communication system;

FIGS. 2 and 3 show waveforms useful in explaining the operation of the inventive system;

FIG. 4 shows one embodiment of the control technique and discriminator circuitry according to the invention;

FIGS. 5 and 6 show waveforms useful in explaining the operation of the inventive circuitry of FIG. 4; and, FIG. 7 is a block diagram indicating a modification of the inventive system of FIG. 1.

DETAILED DESCRIPTION OF THE INVENTION

FIG. 1 shows, in block diagram form, a portion of a multichannel digital data communication system which in one embodiment, is used in a tactical environment wherein radio receiver communicates with multiplexer assemblage which, for example, may be a physical site which is of lower altitude than that of the receiver site.

As is known, the radio receiver 13 receives the incoming signal and transmits it in digital form to the co-located radio modem 13A which extracts timing, regenerates the signal, and transmits the information through cable 17 to the multiplexer modem 19 which extracts timing and provides timing and data information through a security device 22, of any suitable known type, to a time division multiplexer 23 also of any suitable known type. The time division multiplexer 23 provides data over various output channels generally labeled 24, to associated equipment such as a computer 27.

It has been found that, in prior art binary communication systems, during signal fades of three milliseconds or longer, the radio receiver modem 13A and multiplexer modem 19 may lose bit synchronization. The security device 22, the time division multiplexer 23, or the computer 27 may lose both bit and frame synchronization. Accordingly, short propagation disturbances may affect synchronization in many equipments, extend the error, and cause partial or complete disruption of the message being received.

As is known, a digital data transmission system will provide binary data information as a mark signal or a space signal. The radio transmitter does in fact transmit binary information; however, at the receiver input, the data can be considered not as two but rather as three different signals; that is, (a) a mark signal, (b) a space signal, or (c) a noise signal. A noise signal indicates a mark or space indeterminate condition; that is, when neither mark nor space signals exist (fading), or when mark and space signals exist simultaneously (interference).

In accordance with the present invention, applicants provide a control technique and structure for detecting indeterminate signals as well as the mark and space signals, and utilize the indeterminate signal to prevent system synchronization loss during momentary propagation disturbances. This is accomplished by inhibiting false clock corrections and false frame error counting, and continuing the timing function in a "memory" mode during indeterminate intervals.

Refer now to FIGS. 2 and 3, FIG. 2 indicates the operation of the prior art systems wherein for short propagation disturbances the system must be synchronized for a long period of time. In contrast, as shown in FIG. 3, in the system of the present invention, the clock memory is relatively long to maintain proper synchronization; and, system synchronization requires a very short time period, as indicated at SS. This implies that the propagation disturbance must be long in order for the system to lose synchronization. Also, if the system synchronization is lost, the recovery time is relatively short, thus minimizing extension of the instability.

FIG. 4 shows one embodiment of the ternary output detection subsystem 30 of the invention, which may be incorporated as a part of the receiver 13 of FIG. 1. The input circuitry 31 to ternary detection subsystem 30 utilizes balanced amplifier transistor circuits 39A and 39B, as known in the art, to couple the input frequency modulated signals to tuned primary windings 35A and 35B of transformer 33. The balanced amplifiers reduce ripple and cancel other common mode effects which may appear at the secondary output and hence improve detection margins. Additionally, mark tuned and space tuned balanced preamplifier stages 32A and 32B may be connected ahead of amplifiers 39A and 39B respectively for processing the input mark and space signals and further improve detection margins.

The ternary detection subsystem 30 thus effectively utilizes a conventional transformer discriminator to convert mark and space frequencies to signals having distinct amplitudes. The primary windings 35A and 35B of transformer 33 couple respectively to secondary windings 36A and 36B which are isolated from one another and separately tuned to the mark and space frequencies. Note also that although the discriminator is indicated as being a transformer discriminator, other known types of frequency discriminators can be utilized in the present invention.

The output from the tuned secondary winding 36A for the mark signal is coupled through a diode 40A to an RC filter 47, which integrates the mark energy. Likewise, the output from the secondary winding 36B is coupled through a diode 40B through an RC filter circuit 49 which integrates the space energy.

The sampling circuits 52A and 52B of any suitable known design, comprise circuits for sampling the integrated mark and space energy received during each bit time period. The outputs of the sampling circuits are coupled to reception decision gates 43 and 45 where, based upon a predetermined number of samples of preselected amplitude, a determination is made as to whether a valid mark or valid space exists. If a valid mark exists, the decision gate 43 provides an output on the line labeled "Yes" to And gate 60 of the decision logic circuit 59. If at this same time period, the sampling circuit 52B provides outputs to the decision gate 45 to indicate a "No" space signal condition, decision gate 45 provides an output in the line labeled "No" to And circuit 60. The two inputs cause And circuit 60 to provide a valid mark output signal as indicated to the data stream generator 68.

Likewise, if a valid space exists, the decision gate 45 provides an output on the line labeled "Yes" to And gate 63. If at the same time period, the sampling circuit 52A provides outputs to the decision gate 43 to indicate a "No" mark signal condition, gate 43 in turn provides an output on the line labeled "No" to And circuit 63. The two inputs cause And circuit 63 to provide a valid space output signal as indicated to data stream generator 68.

As will be seen from FIG. 4, the output from the decision gates 43 and 45 are also coupled to And circuits 61 and 62. Accordingly, it an output from gates 43 and 45 at a given time period indicates both a mark and space signal, the leads from gates 43 and 45 marked "Yes" are coupled to And circuit 62 which provides an interference condition output through the OR circuit 64 to indicate a signal indeterminate condition to the data stream generator 68, to the clock phase lock loop 54 and to inhibit circuit 56B for purposes to be described. Likewise, if the decision gates 43 and 45 provide an output indicating a "No" signal to And circuit 61, a fade condition exists and an output is coupled through OR circuit 64 to indicate a signal indeterminate condition. Thus, it will be appreciated that both fade and interference conditions provide a signal indeterminate output. Note the output waveform of FIG. 4 wherein the "S" refers to a space signal, the "M" refers to a mark signal and "IND" refers to an indeterminate condition.

Refer now to FIGS. 5 and 6. Curve (a) of FIG. 5 indicates a frequency modulated transmission signal for providing binary output data. Curve (b) indicates signal fade at the receiver input. The discriminator output is indicated in waveform (c). Curve (a) of FIG. 6 indicates a frequency modulated transmission signal for providing binary output data. Curve (b) shows an interfering signal similar to a normal space signal which, in this particular case, impacts the receiver input signal (c). The discriminator output is indicated in waveforms (c) and (d) in both FIGS. 5 and 6 respectively.

In the condition when mark or space output is inhibited, the radio modem circuitry is activated by the decision logic 59 to increase the indeterminate bit length to a time which is longer than the mark and space bits. In the embodiment shown, the indeterminate level is coded in the data streams (d) and (e), respectively, for FIGS. 5 and 6, by increasing the indeterminate bit interval to one and one-half times the normal mark and space intervals. The longer bit is continued or maintained during the time of the mark or space signal indeterminate condition. The data stream supplies timing to the succeeding equipments and system synchronization will be maintained for a "memory" period, depending upon stability of the radio modem's clock. When valid mark and space signals resume, the extended bit is inhibited, and the data stream output is again correlated with the incoming mark and space signals.

Two bits in phase reversal equals a space signal which is the same length as the mark signal. This is a standard practice in the art and is called conditioned diphase. The coding of additional levels is identified in (d) and (e) of FIGS. 5 and 6 as conditioned M-phase. It is possible to include more than three levels on this data stream using the same approach.

As shown in FIG. 4 and mentioned above, the indeterminate output from OR gate 64 is also coupled to the clock phase lock loop 54 of suitable known design when a valid mark or space condition exits. The output of the clock phase lock loop 54 is coupled as a timing correction to the radio modem clock 55 which provides a timing output. When disturbances occur on the propagation path, that is, a signal indeterminate condition occurs, the transmitted signal energy flow into clock phase lock loop 54 is inhibited; this inhibition can be achieved by gate 72 which, during the occurrence of an input from the OR gate 64, prevents signal energy from the data stream generator from entering the clock phase lock loop 54. Radio modem clock 55 then maintains the same timing status independently of the transmitted signal and couples this timing input to the data stream generator as indicated by lead 70. It should be understood that it is important that the radio modem clock 55 be sufficiently stable so that the "memory" period is long compared with the time required to synchronize the system. Upon resumption of valid mark and space signals the radio modem clock 55 will then again be brought onto exact reference with the transmitted clock as indicated by line 69 which couples to the clock phase lock loop 54, if corrections due to clock drift or phasing are necessary.

Further, the foregoing system can also provide a highly sensitive "on line" quality monitoring capability. This can be accomplished by coupling integrated mark and space energy at 47 and 49, respectively, through isolation amplifiers 41A and 41B and the inhibit gates 56A and 56B to the comparator 57 which measures or compares the differences between mark and space energy before regeneration, and without noise. The noise entry into comparator 57 is prevented during indeterminate intervals by the indeterminate signal output from OR gate 64, which is coupled to inhibit gates 56A and 56B which provides access to the comparator 57. The output of the comparator 57 can provide an indication of mark bias. (mark bit longer than space bit), space bias (space bit longer than mark bit), and peak distortion. The time and amplitude differences between mark and space energy indicate certain types of signal degeneration or may indicate a need for alignment in the transmit/receive equipment.

Refer now to FIG. 7. Existing secure half duplex communications must reestablish synchronization (sync) every time transmission direction is reversed, between the radio transceiver and the computer 27A. The invention, by providing a clock "memory" function, makes it possible to maintain synchronization independently of transmission direction once initial sync is established. In FIG. 7, VHF or HF radio transceiver 13C provides ternary detection and clock memory in accordance with the invention. The receiving security device 22A maintains bit sync and frame memory both during signal indeterminate intervals and when the unit is transmitting since clock control logic in the security device responds the same during the transmission interval as during an indeterminate signal interval when it is receiving. After initial sync is established, the computer 27A also maintains bit sync memory and frame memory both during receive indeterminate intervals and also when the unit is transmitting. During transmission, an output from computer 27A can be applied to gate 72, as shown in FIG. 4. Thus, the complete receiver system stays in sync independently of transmission direction. The foregoing technique will provide very significant improvements for VHF and HF radio net applications in noisy environments.

While the invention has been particularly shown and described with reference to a preferred embodiment thereof, it will be understood by those skilled in the art that various changes in form and details may be made therein without departing from the spirit and scope of the invention.

We claim:

1. A digital data communications system for reception of mark information of a first frequency and space information of a second frequency, comprising:
   a first frequency discriminator means tuned to said first frequency for providing a first output level representative of available mark information;
   a second frequency discriminator means tuned to said second frequency for providing a second output level representative of available space information;
   a first decision gating circuit means in the output of said first frequency discriminator means for producing one pair of binary outputs indicating the presence and absence, respectively, of a corresponding mark-representative output level;
   a second decision gating circuit means in the output of said second frequency discriminator means for producing another pair of discrete binary outputs indicating the presence and absence, respectively, of a corresponding space-representative output level; and
   decision logic circuit means connected to said pairs of discrete binary outputs of said decision gating circuit means and having a ternary output circuit, and ternary output circuit including a first terminal at which a mark output signal appears during the presence of a mark-representative binary output only, a second terminal at which a space output signal appears during the presence of a space-representative binary output level only, and a third output terminal at which an information indeterminate condition-indicating output signal appears indicative of either the simultaneous presence of mark and space information or the simultaneous absence of mark and space information.

2. A digital data communication system according to claim 1 further including:
   a data stream generator for producing either mark, space or information indeterminate condition-indicating output bits in accordance with the particular output signal from said decision logic circuit means.

3. A digital data communication system as in claim 2 wherein said data stream generator includes means for producing an information indeterminate condition-indicating output bit of greater length than the output bit length of said mark and space output bits.

4. The digital data communication system of claim 3 further including:
   a multiplexer assemblage responsive to said data stream bits and including a computer terminal device; and
   means within said multiplexer assemblage responsive to either said information indeterminate condition-indicating output bit in the data stream or transmitting mode indication from said computer terminal device for inhibiting loss of bit and frame synchronization within said multiplexer assemblage during period of indeterminancy or during periods of transmission, respectively.

5. The digital data communication system of claim 2 further including:
a stable electronic clock;
a phase lock loop responding to available output signals at said first and second output terminals of said decision logic circuit means for controlling the frequency and phase of said clock during the presence of valid mark or space information; and
means operable in response to said information indeterminate condition-indicating output signal from the third output terminal of said decision logic circuit means for inhibiting the frequency and phase controlling function of said phase lock loop and retaining the previously established frequency and phase of said clock.

6. A digital data communication system as in claim 1 further comprising:
comparator means for comparing and measuring differences in mark and space energy;
means for compiling said mark and space binary output lends to said comparator; and
means responsive to said signal indeterminate condition-indicating output signal for inhibiting said coupling means during intervals of either simultaneous absence of both mark and space information during which the signal to noise ratio is relatively low.

* * * * *